United States Patent [19]

Anderson et al.

[11] Patent Number: 5,695,920
[45] Date of Patent: Dec. 9, 1997

[54] AQUEOUS COATING COMPOSITIONS USEFUL IN THE PREPARATION OF AUXILIARY LAYERS OF IMAGING ELEMENTS

[75] Inventors: Charles Chester Anderson, Penfield; Brian Andrew Schell, Webster; Yongcai Wang, Penfield, all of N.Y.

[73] Assignee: Eastman Kodak Company, Rochester, N.Y.

[21] Appl. No.: 636,203

[22] Filed: Apr. 22, 1996

[51] Int. Cl.$^6$ ................................. G03C 1/76
[52] U.S. Cl. ............... 430/531; 430/523; 430/530; 430/527; 430/631; 430/950; 430/961; 430/935
[58] Field of Search ................... 430/523, 530, 430/531, 527, 631, 950, 961, 935, 271.1, 215

[56] References Cited

U.S. PATENT DOCUMENTS

| | | | |
|---|---|---|---|
| 3,877,945 | 4/1975 | Rosenhahn et al. | 430/531 |
| 4,069,186 | 1/1978 | Ramig | 260/29.6 |
| 4,497,917 | 2/1985 | Upson et al. | 523/201 |
| 4,510,204 | 4/1985 | Duke et al. | 428/463 |
| 4,543,386 | 9/1985 | Padget et al. | 524/523 |
| 4,543,387 | 9/1985 | Padget et al. | 524/523 |
| 4,826,907 | 5/1989 | Murao et al. | 524/394 |
| 4,880,867 | 11/1989 | Gobel et al. | 524/507 |
| 4,954,559 | 9/1990 | Den Hartog et al. | 524/507 |
| 5,006,413 | 4/1991 | Hartog et al. | 428/463 |
| 5,006,451 | 4/1991 | Anderson et al. | 430/527 |
| 5,221,598 | 6/1993 | Anderson et al. | 430/523 |
| 5,366,855 | 11/1994 | Anderson et al. | 430/530 |
| 5,447,832 | 9/1995 | Wang et al. | 430/523 |
| 5,518,867 | 5/1996 | Anderson et al. | 430/533 |
| 5,534,397 | 7/1996 | Anderson et al. | 430/533 |
| 5,536,628 | 7/1996 | Wang et al. | 430/531 |
| 5,550,011 | 8/1996 | Fant et al. | 430/496 |

FOREIGN PATENT DOCUMENTS 0 466 409  1/1992  European Pat. Off. .

*Primary Examiner*—Geraldine Letscher
*Attorney, Agent, or Firm*—Carl F. Ruoff; Alfred P. Lorenzo

[57] ABSTRACT

A coating composition that is useful for the preparation of an auxiliary layer of an imaging element, such as a photographic element, is comprised of an aqueous medium having dispersed therein film-forming polymeric particles and non-film-forming polymeric particles and is characterized in that the film-forming polymeric particles are acid-stable polyurethane particles. These coating compositions have excellent stability characteristics, provide auxiliary layers with improved chemical and physical properties when coated and dried to form a coalesced layer, and provide for reduced emission of volatile organic compounds during the drying process.

19 Claims, No Drawings

AQUEOUS COATING COMPOSITIONS USEFUL IN THE PREPARATION OF AUXILIARY LAYERS OF IMAGING ELEMENTS

FIELD OF THE INVENTION

This invention relates in general to imaging elements such as, for example, photographic elements and in particular to aqueous coating compositions that are useful in the preparation of auxiliary layers of imaging elements. More specifically, this invention relates to aqueous coating compositions that have excellent stability characteristics, that provide auxiliary layers with improved characteristics when coated and dried to form a coalesced layer, and that provide for reduced emission of volatile organic compounds during the drying process.

BACKGROUND OF THE INVENTION

The imaging elements to which this invention relates can be of many different types depending on the particular use for which they are intended. Such elements include, for example, photographic, electrostatographic, photothermographic, migration, electrothermographic, dielectric recording and thermal-dye-transfer imaging elements.

Layers of imaging elements other than the image-forming layer are commonly referred to as auxiliary layers. There are many different types of auxiliary layers such as, for example, subbing layers, backing layers, interlayers, overcoat layers, receiving layers, barrier layers, stripping layers, mordanting layers, scavenger layers, antikinking layers, transparent magnetic layers, and the like.

Support materials for an imaging element often employ layers comprising glassy, hydrophobic polymers such as polyacrylates, polymethacrylates, polystyrenes, or cellulose esters, for example. One typical application is as a backing layer to provide resistance to scratches, abrasion, blocking, and ferrotyping. The latter two properties relate to the propensity of layers applied onto the support material or imaging element to stick together as a result of the adverse humidity, temperature, and pressure conditions that may occur during the manufacture and use of the imaging element.

These glassy polymers are typically coated from organic solvent-based solutions to yield a continuous film upon evaporation of the solvent. However, because of environmental considerations it is desirable to replace organic solvent-based coating formulations with water-based coating formulations. The challenge has been to develop water-based coatings that provide similar physical and chemical properties in the dried film that can be obtained with organic-solvent based coatings.

Water insoluble polymer particles contained in aqueous latexes and dispersions reported to be useful for coatings on photographic films typically have low glass transition temperatures (Tg) to insure coalescence of the polymer particles into a strong, continuous film. Generally the Tg of such polymers is less than 50° C., frequently the Tg is no more than 30° C. Typically these polymers are used in priming or "subbing" layers which are applied onto the film support to act as adhesion promoting layers for photographic emulsion layers. Such low Tg polymers, although useful when they underly an emulsion layer, are not suitable as, for example, backing layers since their blocking and ferrotyping resistance are poor. To fully coalesce a polymer latex with a higher Tg requires significant concentrations of coalescing aids. This is undesirable for several reasons. Volatilization of the coalescing aid as the coating dries is not desirable from an environmental standpoint. In addition, subsequent recondensation of the coalescing aid in the cooler areas of the coating machine may cause coating imperfections and conveyance problems. Coalescing aid which remains permanently in the dried coating will plasticize the polymer and adversely affect its resistance to blocking, ferrotyping, and abrasion.

An approach reported to provide aqueous coatings that require little or no coalescing aid is to use core-shell latex polymer particles. A soft (low Tg) shell allows the polymer particle to coalesce and a hard (high Tg) core provides the desirable physical properties. The core-shell polymers are prepared in a two-stage emulsion polymerization process. The polymerization method is non-trivial and heterogeneous particles that contain the soft polymer infused into the hard polymer, rather than a true core-shell structure, may result (Journal of Applied Polymer Science, Vol. 39, page 2121, 1990). Aqueous coating compositions comprising core-shell latex polymer particles and use of such coalescing aid-free compositions as ferrotyping resistant layers in photographic elements are disclosed in Upson and Kestner U.S. Pat. No. 4,497,917 issued Feb. 5, 1985. The polymers are described as having a core with a Tg of greater than 70° C. and a shell with a Tg from 25° to 60° C. Other aqueous coating compositions that comprise core-shell polymer particles are described in U.S. Pat. Nos. 4,683,269, 4,613,633, 4,567,099, 4,478,974, and 4,134,872. The use of these compositions in photographic films was not disclosed.

An alternative approach reported for aqueous paint and sealant compositions containing little or no coalescing aid comprises a mixture of two latex polymers having different Tg values. Typically, the soft, low Tg polymer comprises the major fraction of the blend and the hard polymer has a Tg less than 45° C. Therefore, these compositions would not be suitable as ferrotyping resistant coatings for photographic elements. For example, U.S. Pat. No. 4,897,291 describes an aqueous formulation useful as a wood sealant that comprises a soft polymer with a Tg of −70° to 5° C. and an optional second polymer with a Tg of 5° to 40° C.

U.S. Pat. No. 4,510,204 describes blends of at least two aqueous nitrile resin latexes that differ in film forming characteristics that are useful as corrosion resistant coatings.

U.S. Pat. No. 4,069,186 describes an aqueous paint composition comprising 25 to 70% of film-forming latex binder having a Tg that is 5° C. or less below the drying temperature, 10 to 60% of non-film-forming latex having a Tg at least 30° C. above the Tg of the film-forming latex, 5 to 25% opacifying pigment, and 0 to 60% non-opacifying pigment. Reportedly, the compositions provide improved physical properties at high pigment volume content.

European Patent Application No. 466409 describes a coalescent-free coating composition comprising a blend of a hard emulsion polymer with a Tg greater than 20° C. and at least one soft emulsion polymer with a Tg less than 20° C. The blend comprises from 20 to 60%, preferably from 20 to 40% of the hard emulsion polymer and 80 to 40%, preferably from 80 to 60% of the soft emulsion polymer.

U.S. Pat. No. 4,826,907 describes an aqueous coating composition comprising 100 parts of a latex with a Tg of −10° to −55° C. and 20 to 300 parts of a latex with a Tg of −45° to 45° C. U.S. Pat. Nos. 4,543,386 and 4,543,387 describe aqueous coating compositions comprising a latex with a Tg between −50° and 0° C. and a second latex with a Tg less than 30° C.

Aqueous coating compositions containing a binder material comprising a mixture of 90 to 40 weight % of acrylic latex containing hydroxyl groups, 10 to 60 weight % polyurethane dispersion, and pigments useful as a top coat for automobiles are described in U.S. Pat. No. 4,880,867. U.S. Pat. Nos. 4,954,559 and 5,006,413 describe aqueous coating compositions for automobile finishes containing 10 to 30 weight % solids that comprise 60 to 90 weight % of a methylol (meth)acrylamide acrylic polymer latex having a Tg of −40° to +40° C. and 10 to 40 weight % of a polyurethane dispersion. The use of these compositions in photographic applications was not disclosed.

There are several differences in designing aqueous coating compositions for photographic applications from those for paint and automobile finishes. One difference is in the drying time cycle. Long drying time cycles can insure that polymer particles contained in a coating composition have sufficient time to pack and deform to form a continuous, void-free film. In interior and exterior paint applications the drying time is of the order of hours or days. In automobile finish applications the drying time lasts at least 10 to 30 minutes. However, in photographic film manufacture the drying time for coatings is typically less than one minute. Often the drying time is as brief as 30 seconds. Therefore, an aqueous coating composition which is effective for paint and automobile finish applications may not be suitable for photographic applications. Under the temperatures and, especially, the residence times employed during the coating and drying of coatings on photographic films, polymer particles with Tg as low as 30° C. may require the addition of high boiling point organic solvent "coalescing aids" to promote the formation of a void-free, continuous film. For example, in Anderson, et. al., U.S. Pat. No. 5,006,451 vinylidene chloride-containing polymer latex barrier layers are described that may utilize a coalescing aid to achieve non-permeable films. The coalescing aids are employed despite the fact that the polymer latexes have a Tg as low as 30° C.

Coatings for photographic applications must provide required physical and chemical properties such as abrasion resistance and impermeability to aqueous film processing solutions using extremely thin layers. Typically these layers are less than 1 micron in thickness. Thus film formation and film quality are especially critical. In addition, coating compositions for photographic film applications must not adversely affect the sensitometric response (such as cause fogging of the photographic emulsion) or reduce the transparency of the processed film.

U.S. Pat. Nos. 5,366,855 and 5,477,832 describe auxiliary layers for an imaging element that are coalesced layers of film-forming colloidal polymeric particles and non-film-forming colloidal polymeric particles. The combination of colloidal polymeric particles having different film forming properties yields aqueous-based coatings that contain little or no organic solvent and form high-quality films that have excellent physical and chemical properties. In these patents, the film-forming or non-film-forming colloidal polymer particles, or both types of polymer particles, may comprise a water-dispersible polyurethane. Water-dispersible polyurethanes are desirable as either the film-forming or non-film-forming polymer particle in these coating compositions since they are readily available commercially and have excellent chemical and physical properties. Examples are cited in the '855 and '832 patents in which a water-dispersible polyurethane is utilized as the film-forming, colloidal polymer particle in these coating compositions and a latex polymer prepared from ethylenically-unsaturated monomers is utilized as the non-film-forming, colloidal polymer particle. Such a combination of colloidal polymer particles yields an excellent combination of low cost, abrasion resistance, toughness, and good chemical properties.

Most often, polyurethane dispersions are colloidally stabilized by electrostatic repulsion that arises as a result of the presence of ionizable moieties which are built into the polymer backbone. Typically this stabilizing moiety is an ionized acid group such as a carboxylic acid group. However, there is an abrupt loss in colloidal stability for these polyurethane dispersions at the pKa of the stabilizing acid group as the pH of the dispersion is reduced from a value above the pKa of the acid. When a carboxylic acid is used as the stabilizing moiety, the polyurethane dispersion is unstable below a pH of about 6. In contrast, no such abrupt loss of colloidal stability is observed for a latex polymer stabilized by the incorporation of a copolymerizable carboxylic acid-containing monomer such as methacrylic acid. In fact, such latex polymers prepared by conventional emulsion polymerization typically have a pH of 2 to 4 and are very stable. For coating compositions containing film-forming colloidal polymer particles and non-film-forming colloidal polymer particles in which a conventional, water-dispersible polyurethane is mixed with an acrylic acid or methacrylic acid containing latex polymer the low pH of this mixture may lead to instability and coagulation of the polyurethane dispersion. This is especially true when an acid-catalyzed crosslinking agent such as a hexamethoxy-alkylmelamine or epoxide is added to crosslink carboxylic acid groups present in the polyurethane or carboxylic acid or other groups such as hydroxyl or epoxy groups in the latex polymer in order to improve the physical and chemical properties of the layer. The use of these types of acid-catalyzed crosslinking agents requires that the pH of these coating compositions be lowered to a pH of 4 or less. Thus, although coating compositions containing a mixture of film-forming and non-film-forming colloidal polymer particles described in the aforementioned prior art references provide coalesced layers having excellent properties such compositions may have poor stability at low pH when thay employ a conventional, water-dispersible polyurethane as the film-forming polymer particle. It is toward the objective of improving the stability of such coating compositions while maintaining the benefits that they provide that the present invention is directed.

SUMMARY OF THE INVENTION

In accordance with this invention, a coating composition that is useful for the preparation of an auxiliary layer of an imaging element is comprised of an aqueous medium having dispersed therein (A) film-forming polymeric particles and (B) non-film-forming polymeric particles and is characterized in that the film-forming polymeric particles are acid-stable polyurethane particles. The use of acid-stable polyurethane particles is highly advantageous in providing improved stability, i.e., resistance to coagulation, even when an acid-catalyzed crosslinking agent is incorporated in the coating composition.

In a particular embodiment, the invention is directed to an imaging element comprising a support, an image-forming layer and an auxiliary layer and is characterized in that the auxiliary layer has been formed by the coating and subsequent drying of the aforesaid coating composition.

The novel coating compositions of this invention have improved solution stability as compared to similar coating compositions of the prior art. In addition, the novel coating compositions of this invention provide a reduction in the amount of organic compound emitted during the drying process and are, therefore, more attractive from an environmental standpoint.

DETAILED DESCRIPTION OF THE INVENTION

Details with respect to the composition and function of a wide variety of different imaging elements are provided in U.S. Pat. No. 5,300,676 and references described therein. The present invention can be effectively employed in conjunction with any of the imaging elements described in the '676 patent.

The support material utilized in this invention can be comprised of various polymeric films, paper, glass, and the like, but, polyester film support, which is well known in the art, is preferred. The thickness of the support is not critical. Support thicknesses of 2 to 10 mil (0.05–0.25 millimeters) can be employed, for example, with very satisfactory results. The polyester support typically employs an undercoat or primer layer well known in the art that comprises, for example, a vinylidene chloride/methyl acrylate/itaconic acid terpolymer or vinylidene chloride/acrylonitrile/acrylic acid terpolymer.

The coating composition of the invention comprises a continuous aqueous phase having dispersed therein a mixture of film-forming polymeric particles (component A) and non-film-forming polymeric particles (component B). Component A comprises 20 to 70%, preferably 30 to 50% of the total weight of components A and B. The average particle sizes of components A and B are 10 to 500 nm, preferably 10 to 200 nm. Other additional compounds that can be incorporated in the coating composition include surfactants, emulsifiers, coating aids, rheology modifiers, matte particles, crosslinking agents, inorganic fillers such as non-conductive metal oxide particles, conductive agents such as conductive metal oxide particles, magnetic particles, pigments, and biocides. The coating composition may also include small amounts of organic solvents, preferably the concentration of organic solvent is less than 1 weight % of the total coating composition.

The coating compositions of the present invention may also include lubricants or combinations of lubricants to reduce the sliding friction of the imaging elements in accordance with the invention. Typical lubricants include (1) silicone based materials disclosed, for example, in U.S. Pat. Nos. 3,489,567, 3,080,317, 3,042,522, 4,004,927, and 4,047,958, and in British Patent Nos. 955,061 and 1,143,118; (2) higher fatty acids and derivatives, higher alcohols and derivatives, metal salts of higher fatty acids, higher fatty acid esters, higher fatty acid amides, polyhydric alcohol esters of higher fatty acids, etc disclosed in U.S. Pat. Nos. 2,454,043, 2,732,305, 2,976,148, 3,206,311, 3,933,516, 2,588,765, 3,121,060, 3,502,473, 3,042,222, and 4,427,964, in British Patent Nos. 1,263,722, 1,198,387, 1,430,997, 1,466,304, 1,320,757, 1,320,565, and 1,320,756, and in German Patent Nos. 1,284,295 and 1,284,294; (3) liquid paraffin and paraffin or wax like materials such as carnauba wax, natural and synthetic waxes, petroleum waxes, mineral waxes and the like; (4) perfluoro- or fluoro- or fluorochloro-containing materials, which include poly (tetrafluoroethlyene), poly(trifluorochloroethylene), poly(vinylidene fluoride), poly(trifluorochloroethylene-co-vinyl chloride), poly(meth)acrylates or poly(meth)acrylamides containing perfluoroalkyl side groups, and the like. Lubricants useful in the present invention are described in further detail in Research Disclosure No.308, published Dec. 1989, page 1006.

Matte particles well known in the art that may be used in the coating compositions of this invention have been described in Research Disclosure No. 308, published Dec 1989, pages 1008 to 1009. When polymer matte particles are employed, they may contain reactive functional groups capable of forming covalent bonds with either the film-forming polymeric particles, the non-film-forming polymeric particles, or both types of polymeric particles that are contained in the coating by intermolecular crosslinking or by reaction with a crosslinking agent in order to promote improved adhesion of the matte particles to the coated layers. Suitable reactive functional groups include: hydroxyl, carboxyl, carbodiimide, epoxide, aziridine, vinyl sulfone, sulfinic acid, active methylene, amino, amide, allyl, and the like.

Suitable crosslinking agents that may effectively be used in the coating compositions of this invention include: aldehydes, epoxy compounds, polyfunctional aziridines, vinyl sulfones, methoxyalkyl melamines, triazines, polyisocyanates, dioxane derivatives, carbodiimides, chrome alum, zirconium sulfate, and the like.

The non-film-forming polymer (B) includes glassy polymers that provide resistance to blocking, ferrotyping, abrasion, and scratches. These polymers include addition-type polymers and interpolymers prepared from ethylenically unsaturated monomers such as acrylates including acrylic acid, methacrylates including methacrylic acid, acrylamides and methacrylamides, itaconic acid and its half esters and diesters, styrenes including substituted styrenes, acrylonitrile and methacrylonitrile, vinyl acetates, vinyl ethers, vinyl and vinylidene halides, and olefins. In addition, crosslinking and graft-linking monomers such as 1,4-butyleneglycol methacrylate, trimethylolpropane triacrylate, allyl methacrylate, diallyl phthalate, divinyl benzene, and the like may be used. The polymeric particles (B) may include reactive functional groups capable of forming covalent bonds by intermolecular crosslinking or by reaction with a crosslinking agent. Suitable reactive functional groups include: hydroxyl, carboxyl, carbodiimide, epoxide, aziridine, vinyl sulfone, sulfinic acid, active methylene, amino, amide, allyl, and the like. The colloidal polymeric particles can be prepared either by emulsion polymerization or by emulsifying preformed polymers in water with a proper dispersing agent. Polymers suitable for component (B) are further defined by the following test. An aqueous coating formulation containing 3 weight % polymer latex or dispersion is applied onto a transparent substrate, for example a thin sheet of polyethylene terephthalate film support, at a wet coverage of 10 cc/m$^2$ and then dried for 2 minutes at 75° C. Non-film-forming polymers are defined as those that do not give transparent, continuous films upon drying.

The film-forming polymer (A) comprises polyurethanes that can form a continuous film under the extremely fast drying conditions typical of the photographic film manufacturing process. Polyurethanes that are suitable for component (A) are those that give transparent, continous films when an aqueous coating formulation comprising 3 weight % of the polymer is applied onto a sheet of transparent support material at a wet coverage of 10 cc/m$^2$ and dried for 2 minutes at 75° C.

Preparation of polyurethane dispersions is well known in the art and involves chain extending a prepolymer containing terminal isocyanate groups by reaction with a diamine or diol. The prepolymer is prepared by reacting a diol or polyol such as a polyester, polyether, polycarbonate, or polyacrylate having terminal hydroxyl groups with excess diisocyanate or polyisocyanate. One of several different synthetic methods may be used for the chain extension step. For example, the polyurethane prepolymer may be chain extended in organic solvent solution and then diluted in water to form the aqueous dispersion, after which the organic solvent may be removed by distillation. Alternatively, the polyurethane prepolymer may be chain extended with diamine or polyamine at the water dispersion step. To allow dispersion of the polyurethane in water the polyurethane is functionalized with water-dispersing groups which are either introduced into the prepolymer prior to chain extension or are introduced as part of the chain extension compound. Anionic, cationic, or nonionically stabilized polyurethane dispersions can be prepared. Cationic stabilized polyurethane dispersions are not desirable for the present invention. Anionic polyurethane dispersions that utilize a neutralized carboxylic acid group as the stabilizing group are the most widely available. However, as already mentioned, polyurethane dispersions stabilized solely by the presence of neutralized carboxylic acid groups intoduced into the polymer backbone are unstable at low pH, i.e., they are not "acid-stable polyurethanes" within the meaning of that term as used herein. The carboxylic acid group is typically neutralized with a volatile amine such as triethylamine which is released from the coating (as a volatile organic compound, VOC) during the drying process.

In the present invention the polyurethane dispersion is preferably stable at a pH as low as 5, and more preferably stable at a pH as low as 4. Polyurethane dispersions that are stable at low pH may be anionically stabilized dispersions that employ sulfonate groups along the polymer backbone as the dispersing group, nonionically stabilized dispersions that employ polyethylene oxide chains within or pendant from the polymer backbone as the dispersing group, or dispersions that employ a combination of both anionic and nonionic stabilization. These latter dispersions are often termed "universal" polyurethane dispersions and utilize both neutralizable carboxylic acid groups and polyethylene oxide chains within or pendant from the polymer backbone to stabilize the dispersion. Such "universal" polyurethanes may require lower concentrations of neutralized carboxylic acid groups compared with conventional polyurethanes that rely exclusively on the presence of neutralized carboxylic acid groups to stabilize the dispersion. Thus, these polyurethanes may reduce the level of volatile amine released as a VOC during the drying process. Polyurethanes utilizing either sulfonate groups or nonionic groups to stabilize the dispersion do not release any volatile amine during drying. Thus, the acid-stable polyurethane dispersions used in the present invention also provide a benefit with respect to lower levels of VOCs in addition to improved solution stability.

Sulfopolymer binders, including sulfo-polyurethanes, for vanadium pentoxide antistatic agents are described in U.S. Pat. Nos. 5,203,884, 5,322,761, 5,372,985, 5,407,603, 5,424,269, 5,427,835, 5,439,785, and 5,468,498. However, these patents do not teach or suggest that such polymers are useful as film-forming polymeric particles for compositions containing a mixture of film-forming and non-film-forming polymeric particles.

In a particularly preferred embodiment, the imaging elements of this invention are photographic elements, such as photographic films, photographic papers or photographic glass plates, in which the image-forming layer is a radiation-sensitive silver halide emulsion layer. Such emulsion layers typically comprise a film-forming hydrophilic colloid. The most commonly used of these is gelatin and gelatin is a particularly preferred material for use in this invention.

Useful gelatins include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly (vinylpyrrolidone), and the like.

The photographic elements of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic element according to this invention comprises a support bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material.

In addition to emulsion layers, the photographic elements of the present invention can contain one or more auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like. The support can be any suitable support used with photographic elements. Typical supports include polymeric films, paper (including polymer-coated paper), glass and the like. Details regarding supports and other layers of the photographic elements of this invention are contained in Research Disclosure, Item 36544, September, 1994.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in *Research Disclosure*, Item 36544, September, 1994, and the references listed therein.

The photographic silver halide emulsions utilized in this invention can contain other addenda conventional in the photographic art. Useful addenda are described, for example, in *Research Disclosure*, Item 36544, September, 1994. Useful addenda include spectral sensitizing dyes, desensitizers, antifoggants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired.

Dye-image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

The compositions of the present invention may be applied as aqueous coating formulations containing up to about 50% total solids by coating methods well known in the art. For example, hopper coating, gravure coating, skim pan/air knife coating, spray coating, and other methods may be used with very satisfactory results. The coatings are dried at temperatures up to 150° C. to give dry coating weights of 20 mg/m$^2$ to 10 g/m$^2$.

The invention is further illustrated by the following examples of its practice.

The polymer latex and polyurethane dispersions used in the examples are listed in Table 1. The film forming characteristic of each polymer was defined by the following test. An aqueous coating formulation comprising 3 weight % polymer latex or polyurethane dispersion was applied onto a transparent substrate, for example a thin sheet of polyethylene terephthalate film support, at a wet coverage of 10 cc/m$^2$ and then dried for 2 minutes at 75° C. Non-film-forming polymers were taken as those that do not give transparent, continuous films upon drying while film-forming polymers were taken as those that gave transparent, continuous films.

TABLE 1

| Polymer | Polymer Description | Film Forming Characteristics |
|---|---|---|
| P-1 | polymethyl methacrylate-co-methacrylic acid (97/3) latex | non-film-forming |
| P-2 | Zeneca Resins Neorez 960 polyurethane dispersion | film-forming |
| P-3 | Witco Corp. Witcobond 232 polyurethane dispersion | film-forming |
| P-4 | Zeneca Resins Neorez 9320 polyurethane dispersion | film-forming |
| P-5 | Bayer Corp. Bayhydrol DLN polyurethane dispersion | film-forming |
| P-6 | Bayer Corp. Bayhydrol 140 AQ polyurethane dispersion | film-forming |
| P-7 | Bayer Corp. Bayhydrol LS-2033 polyurethane dispersion | film-forming |

Polyurethane dispersions P-2 through P-7 were diluted to 5% solids by diluting with demineralized water and then titrated slowly with dilute acid until the dispersion coagulated. The pH value at which coagulation occurred was recorded and tabulated in Table 2.

TABLE 2

| Polymer | Stabilizing Group | pH Where Coagulation Occurred |
|---|---|---|
| P-2 | neutralized COOH | 5.95 |
| P-3 | neutralized COOH | 5.95 |
| P-4 | "universal" | 3.00 |
| P-5 | sulfonate | 2.00 |
| P-6 | sulfonate | 2.00 |
| P-7 | sulfonate | 2.00 |

Thus, P-2 and P-3 are not "acid-stable polyurethanes" within the meaning of that term as used herein whereas P-4, P-5, P-6 and P-7 are acid-stable polyurethanes.

The use of conventional, i.e., non-acid-stable polyurethane dispersions in the prior art has been plagued by problems of instability and coagulation. This is especially the case when an acid-catalyzed crosslinking agent such as a hexamethoxyalkylmelamine or epoxide is incorporated in the coating composition. These problems are effectively avoided in this invention by the use of acid-stable polyurethane particles.

EXAMPLES 1–6 AND COMPARATIVE SAMPLES A–E

Aqueous coating compositions comprising 6.67 weight % total solids were prepared and coated onto 0.1 millimeter thick polyethylene terephthalate film support that had been subbed with a terpolymer latex of acrylonitrile, vinylidene chloride, and acrylic acid. The coating compositions comprised various ratios of non-film-forming polymer particles to film-forming polymer particles, hexamethoxymethylmelamine (Cymel 300, Cytec Industries Inc.) or polyfunctional aziridine (CX100, Zeneca Resins) crosslinking agents added at 10 weight % of the total solids, and Triton X-100 surfactant (Rohm & Haas) added at 0.06 weight % of the total solids. For coating compositions containing hexamethoxymethylmelamine as the crosslinking agent, dilute aqueous p-toluene sulfonic acid was added to adjust the pH of the coating composition in order to catalyze the crosslinking reaction. The coating formulations, formulation pH values, formulation dispersion stabilities, and appearance of the coatings after drying at 90° C. for 2 minutes are listed in Table 3.

TABLE 3

| Example | Composition | Cross-linking Agent* | Formulation pH Stability | Coating Appearance |
|---|---|---|---|---|
| Sample A | P-1/P-2 50/50 | HMMM | 4.0 coagulated | could not coat |
| Sample B | P-1/P-3 50/50 | HMMM | 4.0 coagulated | could not coat |
| Sample C | P-1/P-2 50/50 | HMMM | 5.0 coagulated | could not coat |
| Sample D | P-1/P-3 50/50 | HMMM | 5.0 coagulated | could not coat |
| Sample E | P-1/P-2 70/30 | none** | 5.9 some coagulation | particles in coating |
| Example 1 | P-1/P-4 50/50 | HMMM | 4.0 no coagulation | transparent |
| Example 2 | P-1/P-5 50/50 | HMMM | 3.0 no coagulation | transparent |
| Example 3 | P-1/P-6 | HMMM | 3.0 no | transparent |

TABLE 3-continued

| Example | Composition | Cross-linking Agent* | Formulation pH | Stability | Coating Appearance |
|---|---|---|---|---|---|
| Example 4 | 50/50 P-1/P-7 | HMMM | 3.0 | no coagulation | transparent |
| Example 5 | 50/50 P-1/P-4 | HMMM | 4.0 | no coagulation | transparent |
| Example 6 | 70/30 P-1/P-4 50/50 | aziridine | 5.0 | no coagulation | transparent |

*HMMM = hexamethoxymethylmelamine
**no p-toluene sulfonic acid added

The results of Table 3 clearly demonstrate the superior solution stability for coating compositions of the invention compared to samples A through E of the prior art that utilize a polyurethane dispersion as the film-forming polymer particle that is not stable in acidic medium. Polyurethane dispersions that are not stable in acidic medium may have poor stability in the presence of carboxylic acid-containing, non-film-forming latex polymers even without the addition of an acid catalyzed crosslinking agent as shown in sample E.

EXAMPLE 7

The following example demonstrates the excellent physical properties that are obtained with coating compositions of the invention. A subbed polyester film support as previously described was coated with an aqueous antistatic formulation comprising 0.025 weight % of silver-doped vanadium pentoxide, 0.075 weight % of a terpolymer latex of methylacrylate, vinylidene chloride, and itaconic acid and dried at 100° C. to yield an antistatic layer having a dry weight of about 8 mg/m$^2$. An aqueous coating composition of the invention with a pH equal to 5.0 comprising 6.67 weight % total solids having a weight ratio of non-film-forming polymer particles P-1 to film-forming polymer particles P-4 equal to 70/30 and containing polyfunctional aziridine (CX100, Zeneca Resins) crosslinking agent added at 10 weight % of the total solids and Triton X-100 surfactant (Rohm & Haas) added at 0.06 weight % of the total solids was applied onto the antistatic layer and dried at 90° C. for 2 minutes to give a transparent film (example 7) with a dry coating weight of 1000 mg/m$^2$.

Taber abrasion for example 7, determined in accordance with the procedures set forth in ASTM D1044, was found to be 14.8% haze. It is known (described in U.S. Pat. Nos. 5,006,451 and 5,221,598) that the antistatic properties of the vanadium pentoxide layer are destroyed after film processing if not protected by an impermeable barrier. Thus the impermeability of the example coating could be evaluated by measuring the antistatic properties (defined by the internal resistivity value) of a sample after processing in conventional film developing and fixing solutions. The sample was soaked in developing and fixing solutions as described in U.S. Pat. No. 4,269,929, at 38° C. for 60 seconds each and then rinsed in distilled water. The internal resistivity of the processed sample at 20% relative humidity was measured using the salt bridge method described in R. A. Elder, "Resistivity Measurements on Buried Conductive Layers", EOS/ESD Symposium Proceedings, September 1990, pp. 251–254 and found to be $3\times10^9$ ohms/square. A comparative sample comprising the vanadium pentoxide antistatic layer, but, no overcoat layer was processed in a similar manner and found to have a resistivity value greater than $1\times10^{14}$ ohms/square.

The invention has been described in detail with particular reference to certain preferred embodiments thereof, but it will be understood that variations and modifications can be effected within the spirit and scope of the invention.

We claim:

1. A coating composition that is useful for the preparation of an auxiliary layer of an imaging element; said coating composition comprising an aqueous medium having dispersed therein (A) film-forming polymeric particles and (B) non-film-forming polymeric particles; said film-forming polymeric particles being acid-stable polyurethane particles wherein said polyurethane particles form a stable dispersion at a pH below 5.

2. A coating composition as claimed in claim 1, wherein said film-forming polymeric particles comprise 20 to 70 percent of the total weight of both said film-forming polymeric particles and said non-film-forming polymer particles.

3. A coating composition as claimed in claim 1, wherein said film-forming polymeric particles comprise 30 to 50 percent of the total weight of both said film-forming polymeric particles and said non-film-forming polymeric particles.

4. A coating composition as claimed in claim 1, wherein said film-forming polymeric particles have an average particle size of 10 to 500 nanometers.

5. A coating composition as claimed in claim 1, wherein said film-forming polymeric particles have an average particle size of 10 to 200 nanometers.

6. A coating composition as claimed in claim 1, wherein said non-film-forming polymeric particles have an average particle size of 10 to 500 nanometers.

7. A coating composition as claimed in claim 1, wherein said non-film-forming polymeric particles have an average particle size of 10 to 200 nanometers.

8. A coating composition as claimed in claim 1, additionally comprising a lubricant.

9. A coating composition as claimed in claim 1, additionally comprising a crosslinking agent.

10. A coating composition as claimed in claim 1, wherein said non-film-forming polymeric particles are particles of an addition-type polymer prepared from ethylenically-unsaturated monomers.

11. A coating composition as claimed in claim 1, wherein said non-film-forming polymeric particles are particles of an addition-type polymer prepared from ethylenically-unsaturated monomers and include functional groups selected from hydroxyl, carboxyl, carbodiimide, epoxide, aziridine, vinyl sulfone, sulfinic acid, active methylene, amino, amide and allyl.

12. A coating composition as claimed in claim 1, wherein said polyurethane particles form a stable dispersion at a pH below 4.

13. A coating composition as claimed in claim 1, wherein said polyurethane particles comprise an anionically stabilized dispersion employing sulfonate groups along the polymer backbone.

14. A coating composition as claimed in claim 1, wherein said polyurethane particles comprise a nonionically stabilized dispersion employing polyethylene oxide chains within or pendant from the polymer backbone.

15. A coating composition as claimed in claim 1, wherein said polyurethane particles comprise a universal dispersion that utilizes both neutralizable carboxylic acid groups and polyethylene oxide chains within or pendant from the polymer backbone.

16. A coating composition as claimed in claim 1, wherein said composition contains up to 50 percent by weight total solids.

17. An imaging element comprising a support, an image-forming layer and an auxiliary layer; said auxiliary layer having been formed by the coating and subsequent drying of a coating composition comprising an aqueous medium having dispersed therein (1) film-forming polymeric particles and (2) non-film-forming polymeric particles; said film-forming polymeric particles being acid-stable polyurethane particles wherein said polyurethane particles from a stable dispersion at a pH below 5.

18. An imaging element as claimed in claim 17, wherein the dry coating weight of said auxiliary layer is from 20 mg/m$^2$ to 10 g/m$^2$.

19. An imaging element as claimed in claim 17, wherein said auxiliary layer is a barrier layer overlying an antistatic layer comprising vanadium pentoxide.

* * * * *